(12) United States Patent
Hiernaux

(10) Patent No.: US 11,203,935 B2
(45) Date of Patent: Dec. 21, 2021

(54) BLADE WITH PROTUBERANCE FOR TURBOMACHINE COMPRESSOR

(71) Applicant: SAFRAN AERO BOOSTERS SA, Herstal (BE)

(72) Inventor: Stéphane Hiernaux, Oupeye (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 165 days.

(21) Appl. No.: 16/556,586

(22) Filed: Aug. 30, 2019

(65) Prior Publication Data

US 2020/0080423 A1 Mar. 12, 2020

(30) Foreign Application Priority Data

Aug. 31, 2018 (BE) .................................. 2018/5606

(51) Int. Cl.
  *F01D 5/14* (2006.01)
  *F04D 29/32* (2006.01)

(52) U.S. Cl.
  CPC ........... *F01D 5/141* (2013.01); *F04D 29/324* (2013.01); *F05D 2240/305* (2013.01); *F05D 2240/306* (2013.01); *F05D 2250/75* (2013.01)

(58) Field of Classification Search
  CPC ........ F01D 5/141; F01D 5/145; F04D 29/324; F05D 2240/305; F05D 2240/306; F05D 2250/75
  See application file for complete search history.

(56) References Cited

U.S. PATENT DOCUMENTS

| 3,012,709 | A | * | 12/1961 | Schnell | ................. | F04D 29/681 |
|---|---|---|---|---|---|---|
| | | | | | | 416/236 R |
| 3,014,640 | A | * | 12/1961 | Barney | ................. | F04D 29/324 |
| | | | | | | 415/194 |
| 3,077,173 | A | * | 2/1963 | Lang | ...................... | B63B 1/248 |
| | | | | | | 114/278 |
| 3,409,968 | A | * | 11/1968 | Denes | .................... | B23P 15/02 |
| | | | | | | 29/889.7 |
| 3,653,110 | A | * | 4/1972 | King, Jr. | ................... | F01D 5/28 |
| | | | | | | 29/889.72 |
| 3,748,721 | A | * | 7/1973 | Alexander | .............. | F01D 5/147 |
| | | | | | | 228/185 |

(Continued)

FOREIGN PATENT DOCUMENTS

| DE | 2135287 A1 | * | 1/1973 | ............ | F01D 5/145 |
|---|---|---|---|---|---|
| EP | 2019186 A1 | | 1/2009 | | |

(Continued)

OTHER PUBLICATIONS

Search Report dated May 7, 2019 for BE 201805606.

*Primary Examiner* — Woody A Lee, Jr.
*Assistant Examiner* — Brian Christopher Delrue
(74) *Attorney, Agent, or Firm* — James E. Walton

(57) ABSTRACT

A turbine engine compressor blade includes a leading edge, a trailing edge, a suction surface, and a pressure surface. In addition, the blade includes at least one irregularity in the form of a projecting protuberance of the suction surface or the pressure surface or in the form of a recess nested in the suction surface or the pressure surface. The irregularity may have a direction of longest dimension substantially parallel to the leading edge or substantially axial.

9 Claims, 3 Drawing Sheets

(56) References Cited

U.S. PATENT DOCUMENTS

| | | | | |
|---|---|---|---|---|
| 3,973,870 A * | 8/1976 | Desai | F01D 25/32 | 415/169.4 |
| 4,108,573 A * | 8/1978 | Wagner | F01D 5/141 | 416/236 A |
| 4,720,239 A * | 1/1988 | Owczarek | F01D 5/16 | 415/181 |
| 4,830,315 A * | 5/1989 | Presz, Jr. | F01D 5/141 | 244/200 |
| 5,112,187 A * | 5/1992 | Davids | F01D 5/145 | 415/169.3 |
| 5,288,209 A * | 2/1994 | Therrien | G05B 19/401 | 416/193 R |
| 5,395,071 A * | 3/1995 | Felix | B64C 3/14 | 244/35 R |
| 5,704,763 A * | 1/1998 | Lee | F01D 5/188 | 416/96 R |
| 5,931,641 A * | 8/1999 | Finn | F01D 5/147 | 416/229 A |
| 6,092,766 A * | 7/2000 | LaRoche | B64C 21/10 | 244/200 |
| 6,328,532 B1 * | 12/2001 | Hahnle | F01D 5/147 | 416/224 |
| 6,358,012 B1 * | 3/2002 | Staubach | F01D 5/141 | 416/228 |
| 6,565,324 B1 * | 5/2003 | Phillipsen | F01D 5/20 | 416/236 R |
| 6,607,359 B2 * | 8/2003 | von Flotow | F01D 5/16 | 416/229 R |
| 6,733,240 B2 * | 5/2004 | Gliebe | F04D 29/324 | 416/228 |
| 6,837,679 B2 * | 1/2005 | Kawarada | F01D 5/145 | 415/191 |
| 6,905,309 B2 * | 6/2005 | Nussbaum | F01D 5/10 | 29/889.1 |
| 6,976,826 B2 * | 12/2005 | Roy | F01D 5/141 | 416/1 |
| 7,090,463 B2 * | 8/2006 | Milburn | F01D 5/147 | 415/211.2 |
| 7,134,842 B2 * | 11/2006 | Tam | F01D 5/145 | 416/193 A |
| 7,217,096 B2 * | 5/2007 | Lee | F01D 5/186 | 416/97 R |
| 7,220,100 B2 * | 5/2007 | Lee | F01D 5/143 | 415/191 |
| 7,220,103 B2 * | 5/2007 | Cunha | F01D 5/081 | 416/193 A |
| 7,249,933 B2 * | 7/2007 | Lee | F01D 5/145 | 416/97 R |
| 7,600,979 B2 * | 10/2009 | Steibel | C04B 35/62863 | 416/230 |
| 7,972,115 B2 * | 7/2011 | Potier | F01D 5/20 | 416/228 |
| 8,167,572 B2 * | 5/2012 | Tardif | F01D 5/147 | 416/228 |
| 8,186,965 B2 * | 5/2012 | Kuhne | F01D 5/20 | 416/228 |
| 8,241,003 B2 * | 8/2012 | Roberge | F04D 29/023 | 416/229 R |
| 8,393,872 B2 * | 3/2013 | Kirtley | F01D 5/141 | 416/243 |
| 8,419,372 B2 * | 4/2013 | Wood | F04D 29/324 | 416/223 R |
| 8,573,541 B2 * | 11/2013 | Sullivan | B64C 3/16 | 244/200 |
| 8,662,836 B2 * | 3/2014 | Winkler | F01D 9/041 | 415/191 |
| 8,814,529 B2 * | 8/2014 | Fiala | F01D 5/145 | 416/236 R |
| 8,944,774 B2 * | 2/2015 | Bielek | F01D 5/145 | 416/236 A |
| 9,004,865 B2 * | 4/2015 | Guimbard | F01D 5/145 | 416/90 R |
| 9,017,030 B2 * | 4/2015 | Beeck | F01D 5/141 | 416/193 A |
| 9,046,111 B2 * | 6/2015 | Harvey | F04D 29/544 | |
| 9,062,554 B2 * | 6/2015 | Bielek | F01D 5/145 | |
| 9,085,985 B2 * | 7/2015 | Barr | F01D 5/143 | |
| 9,121,294 B2 * | 9/2015 | Kray | F01D 5/282 | |
| 9,188,017 B2 * | 11/2015 | Xu | F01D 9/041 | |
| 9,212,558 B2 * | 12/2015 | Praisner | F04D 29/681 | |
| 9,249,666 B2 * | 2/2016 | Wood | F03D 1/0633 | |
| 9,650,914 B2 * | 5/2017 | Lecuyer | F01D 21/02 | |
| 9,896,950 B2 * | 2/2018 | Willer | F01D 9/041 | |
| 10,215,194 B2 * | 2/2019 | Theratil | F04D 29/666 | |
| 10,352,330 B2 * | 7/2019 | Collier | F04D 29/321 | |
| 10,408,070 B2 * | 9/2019 | Mahias | F01D 5/16 | |
| 10,436,044 B2 * | 10/2019 | Schlemmer | F01D 9/041 | |
| 10,465,520 B2 * | 11/2019 | Vandeputte | B23K 26/342 | |
| 10,480,323 B2 * | 11/2019 | Balzer | F01D 5/141 | |
| 10,605,087 B2 * | 3/2020 | Xu | F01D 5/142 | |
| 10,895,161 B2 * | 1/2021 | Vogiatzis | F01D 5/141 | |
| 10,907,648 B2 * | 2/2021 | Vogiatzis | F04D 29/384 | |
| 2001/0033793 A1 * | 10/2001 | Lewis | F01D 5/16 | 416/232 |
| 2004/0081548 A1 * | 4/2004 | Zess | F04D 29/544 | 415/1 |
| 2004/0241003 A1 * | 12/2004 | Roy | F01D 5/20 | 416/236 R |
| 2005/0047919 A1 * | 3/2005 | Nussbaum | F01D 5/16 | 416/235 |
| 2005/0106030 A1 * | 5/2005 | Bachofner | F01D 5/20 | 416/235 |
| 2006/0140768 A1 * | 6/2006 | Tam | F01D 5/143 | 416/193 A |
| 2007/0258818 A1 * | 11/2007 | Allen-Bradley | F01D 5/143 | 416/193 A |
| 2007/0258819 A1 * | 11/2007 | Allen-Bradley | F01D 5/143 | 416/193 A |
| 2008/0175716 A1 * | 7/2008 | Potier | F01D 11/10 | 416/97 R |
| 2008/0279692 A1 * | 11/2008 | Karamavruc | F16H 41/26 | 416/237 |
| 2009/0185911 A1 * | 7/2009 | Roberge | F01D 5/147 | 416/236 R |
| 2010/0158696 A1 * | 6/2010 | Pandey | F01D 5/145 | 416/243 |
| 2011/0097210 A1 * | 4/2011 | Kirtley | F01D 5/141 | 416/223 A |
| 2011/0188999 A1 * | 8/2011 | Braun | F01D 5/143 | 415/170.1 |
| 2011/0206527 A1 * | 8/2011 | Harvey | F04D 29/681 | 416/223 R |
| 2012/0061522 A1 * | 3/2012 | Sullivan | B64C 3/14 | 244/198 |
| 2012/0128480 A1 * | 5/2012 | Gomez | F04D 29/681 | 415/208.1 |
| 2012/0328447 A1 * | 12/2012 | Hofmann | F01D 5/20 | 416/235 |
| 2013/0101409 A1 * | 4/2013 | Beeck | F01D 5/141 | 415/208.2 |
| 2013/0164488 A1 * | 6/2013 | Wood | F01D 9/041 | 428/80 |
| 2013/0266451 A1 * | 10/2013 | Pesteil | F01D 5/14 | 416/223 R |
| 2014/0219811 A1 * | 8/2014 | Lee | F01D 5/141 | 416/236 R |
| 2014/0248154 A1 * | 9/2014 | Guemmer | F04D 29/681 | 416/223 A |
| 2015/0075178 A1 * | 3/2015 | Halfmann | F01D 5/141 | 60/805 |
| 2015/0107265 A1 * | 4/2015 | Smith | F01D 5/143 | 60/805 |
| 2015/0354367 A1 * | 12/2015 | Gallagher | F01D 5/145 | 60/805 |
| 2016/0024930 A1 * | 1/2016 | Aaron | F01D 5/141 | 416/236 R |
| 2016/0146012 A1 * | 5/2016 | Warikoo | F01D 5/141 | 415/208.2 |
| 2017/0159442 A1 * | 6/2017 | Velazquez, Jr. | F01D 5/141 | |

(56) References Cited

U.S. PATENT DOCUMENTS

| | | | |
|---|---|---|---|
| 2017/0183974 A1* | 6/2017 | McDufford | F01D 5/147 |
| 2017/0218976 A1* | 8/2017 | McGill | F04D 29/544 |
| 2017/0234134 A1* | 8/2017 | Bunker | F15D 1/004 |
| | | | 415/208.2 |
| 2018/0023397 A1* | 1/2018 | Vandeputte | F01D 9/041 |
| | | | 416/228 |
| 2018/0023398 A1* | 1/2018 | Jones | F01D 5/145 |
| | | | 416/95 |
| 2019/0101002 A1* | 4/2019 | Duffin | F04D 29/384 |
| 2019/0128121 A1* | 5/2019 | Hiernaux | F04D 29/321 |
| 2019/0186271 A1* | 6/2019 | Xu | F01D 5/284 |

FOREIGN PATENT DOCUMENTS

| | | | | |
|---|---|---|---|---|
| EP | 2093378 A1 * | 8/2009 | | B23P 6/002 |
| FR | 2114693 A5 * | 6/1972 | | F01D 5/147 |
| FR | 2867506 A1 * | 9/2005 | | F04D 29/544 |
| GB | 750305 A | 6/1956 | | |
| GB | 2032048 A | 4/1980 | | |
| GB | 2033022 A * | 5/1980 | | B22F 7/064 |
| JP | H0711901 A | 1/1995 | | |

\* cited by examiner

US 11,203,935 B2

BLADE WITH PROTUBERANCE FOR TURBOMACHINE COMPRESSOR

This application claims priority under 35 U.S.C. § 119 to Belgium Patent Application No. 2018/5606, filed 31 Aug. 2018, titled "Blade with Protuberance for Turbomachine Compressor" which is incorporated herein by reference for all purposes.

BACKGROUND

1. Field of the Application

The present application relates to the field of axial turbomachines and in particular aircraft turbojet engine compressors. More specifically, the present application relates to a particular design of a blade for an axial turbomachine.

2. Description of Related Art

In an axial turbomachine compressor aerodynamic losses can occur. For example, some interferences between the flow near the shroud and the flow deviated in the vicinity of the blade causes so-called "secondary" phenomena which result in losses and instabilities ("tip leakage vortex", "corner stall", . . . ).

In order to mitigate this phenomenon, different blade shapes have been developed, for example with a "sweep" or "bow" effect, extending the blade axially or circumferentially.

It is also known to provide protuberances on the inner or outer shrouds that support the blades. This principle often takes the name of "contouring" or "3D contouring" because it consists in a modification of the outline of the shroud. Hollow or bumps can thus be designed on a flow guiding surface between two adjacent blades.

The document US 2013/0101409 A1 describes an example of contouring in which a protuberance is provided at the junction between the blade and the ferrule. In the downstream extension of this protuberance, a bump is arranged on the suction surface of a blade at the trailing edge. This design nevertheless leaves room for possible improvement in terms of efficiency of the compressor.

Although great strides have been made in the area of axial turbomachine blades, many shortcomings remain.

DETAILED DESCRIPTION OF THE PREFERRED EMBODIMENT

Figure 1:
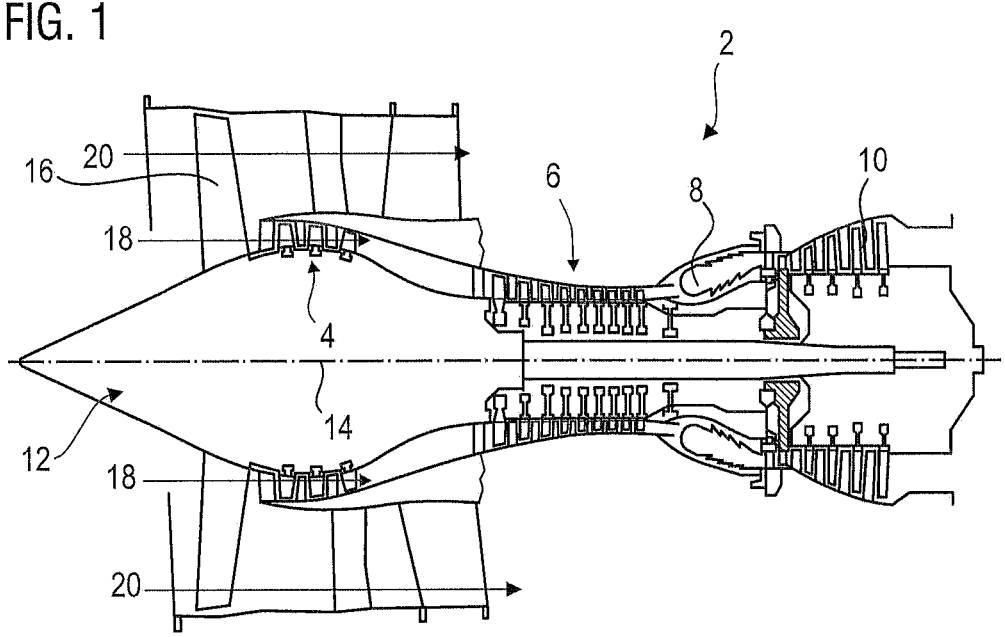
FIG. 1 shows an axial turbomachine according to the present application.

The present application aims to minimize aerodynamic losses in order to improve the efficiency of a turbomachine, in particular at the compressor blades.

The present application relates to a blade for an axial turbomachine compressor, the blade comprising a leading edge, a trailing edge, a suction surface and a pressure surface, the blade having a height and further comprising at least one irregularity in the form of a protrusion protruding from the suction surface or from the pressure surface or in the form of a recess nested in the suction surface or in the pressure surface, the irregularity having a direction of longest dimension that is substantially parallel to the leading edge, the irregularity having a variation of depth or thickness along said direction, wherein a point of the irregularity having the maximum thickness or maximum depth has a radial position which is between 25 and 75% of the height of the blade.

The irregularity may be a thickening or a thinning of the blade relative to a nominal profile. The irregularity is continuous and progressive in the three directions of space.

As the leading edge can be curved, to qualify its orientation, it may be appropriate to refer to its average direction.

The maximum thickness or depth is the greatest distance between the surface of the irregularity and the nominal theoretical surface of the suction or pressure surface in the absence of irregularity. The present application may use indifferently the terms thickness or maximum depth as well as "amplitude".

According to a preferred embodiment of the present application, the point of the irregularity having the maximum thickness or depth has a position along the chord line, measured from the leading edge, of between 0 and 30% of the chord line.

According to a preferred embodiment of the present application, the irregularity has a direction of greater dimension which forms an angle between 0 and 20° relative to the average direction of the leading edge.

The present application also relates to a blade for an axial turbomachine compressor, the blade comprising a leading edge, a trailing edge, a suction surface and an pressure surface, the blade having a height with a radial outer half and further comprising at least one irregularity integral with the blade and aimed at guiding a flow of air of the turbomachine, the irregularity being in the form of a protrusion protruding from the suction surface or the pressure surface or in the form of a recess nested in the suction surface or the pressure surface, the irregularity being restricted to the radial outer half of the blade and having a direction of longest dimension that is substantially axial.

According to a preferred embodiment of the present application, the point of the irregularity having the maximum thickness or depth has a radial position which is between 70 and 100% of the height of the blade.

According to a preferred embodiment of the present application, the point of the irregularity having the maximum thickness or depth has a position along the chord line, measured from the leading edge, of between 0 and 50% of the chord line.

In other words, the irregularity is in this case mainly in the upstream part of the blade.

According to preferred embodiment of the present application, the irregularity has a direction of greater dimension which forms an angle of between 45 and 90° with the mean direction of the leading edge.

According to a preferred embodiment of the present application, the form factor of the irregularity (length over width) is greater than two.

The form factor is the ratio between the size of the irregularity in the direction of longest dimension and its dimension in the direction of second longest dimension. The dimensions of the irregularity can be measured in a curvilinear manner along the pressure or the suction surface.

According to a preferred embodiment of the present application, the blade comprises a root and a head defining the radial ends of the blade, the irregularity being at a distance from the root and the head of the blade of at least 5% the radial height of the blade.

Thus, the irregularity is remote from the junctions between the blade and the ferrules.

According to a preferred embodiment of the present application, the maximum thickness or depth of the irregularity, measured according to the normal to the suction or the pressure surface is between 1 and 15% of the thickness of the blade measured at the point of irregularity presenting the maximum thickness or depth.

In practice, the amplitude of the irregularities can therefore be between a few hundredths of a millimetre and 1 or 2 mm at most.

According to a preferred embodiment of the present application, the irregularity is asymmetrical, the middle point of the irregularity in the direction of longest dimension being preferably upstream of the point having the maximum thickness or depth.

This shape makes it possible to progressively divert the flow from upstream to downstream.

According to a preferred embodiment of the present application, the irregularity extends mainly in a non-linear direction, possibly in S-shape. Thus, seen from a circumferential or normal direction at the suction or pressure surface, the irregularity can have an S shape.

According to a preferred embodiment of the present application, the irregularity has a variation of width. The irregularity may have a larger width upstream than downstream or vice versa. The difference between its upstream width and its downstream width may be at least 20%.

According to a preferred embodiment of the present application, the irregularity comprises a plurality of points for which the thickness or the depth of the irregularity is maximum. Thus, the irregularity may comprise a curve or a surface parallel to the suction surface or the pressure surface, thus forming a plateau.

According to a preferred embodiment of the present application, the irregularity forms with the suction or the pressure surface a continuous and derivable surface. Thus, there is no angular point or angular edge, neither on the irregularity itself, nor at the junction between the irregularity and the suction or the pressure surface, and that is true in the three directions of space.

The blade may be manufactured by an additive manufacturing process.

In particular, additive manufacturing makes it possible to obtain forms of irregularities that cannot be obtained by conventional methods (plastic deformation or machining).

The present application also relates to a turbomachine compressor, comprising at least one row of rotor blades and at least one row of stator vanes, the compressor being according to one of the embodiments described above.

According to a preferred embodiment of the present application, the blades are borne by an inner ferrule and/or an outer ferrule, the ferrules having between two blades circumferentially adjacent a regular cylindrical or conical surface.

By regular surface is meant a surface devoid of irregularity. Only the suction or the pressure surface of the blades are provided with irregularity(ies).

According to preferred embodiment of the present application, the compressor comprises two blades according to the embodiments described above, the two blades being are arranged circumferentially adjacent to one another, and wherein one of the two blades has an irregularity on the suction surface face facing the other of the two blades, and the other of the two blades has an irregularity on the pressure surface facing the one of the two blades, the irregularity on the suction surface of the one of the two blades forming a first surface and the irregularity on the pressure surface of the other of the two blades forming a second surface, the first and second surfaces being at least in part parallel to one another or being at least in part the image of one another after rotation about the axis of the compressor.

The compressor may comprise at least: fifty, or eighty or one hundred blades according to one of the variants described above.

The various features of each embodiment can be combined with any other features of another embodiment according to all possible technical combinations, unless otherwise not explicitly mentioned.

In particular, a blade may comprise several irregularities according to the variants exposed above on its suction and pressure surface.

The present application makes it possible to redirect the flow in the passage. The irregularity tends to prevent the detachment of the air flow from the blade. The flow rate passing through the compressor can increase in pressure while avoiding the phenomena of pumping.

The present application also provides a simpler, more resistant, and lighter technical solution.

The designs presented in the present application also allow the increase of the mechanical and aerodynamic stability of the blade.

In the following description, the wordings "internal" and "external" refer to a positioning relative to the axis of rotation of an axial turbomachine. The axial direction corresponds to the direction along the axis of rotation of the turbomachine. The radial direction is perpendicular to the axis of rotation. Upstream and downstream are in reference to the main direction of the flow in the turbomachine. The length is the largest dimension of an element, the width is its second largest dimension.

It should be noted that the figures and in particular those representing the protrusion or the recess of the blade, are not drawn to scale and that the dimensions can be exaggerated to more clearly represent some of the aspects of the present application.

FIG. 1 is a simplified representation of an axial turbomachine. It is in this case a double-flow turbojet 2.

The turbojet engine 2 comprises a first compression stage, called a low-pressure compressor 4, a second compression stage, called a high-pressure compressor 6, a combustion chamber 8 and one or more stages of turbines 10. In operation, the mechanical power of the turbine 10 transmitted via the central shaft to the rotor 12 drives the two compressors 4 and 6 in motion. The latter comprise several rows of rotor blades associated with rows of stator vanes. The rotation of the rotor about its axis of rotation 14 makes it thus possible to generate an air flow and to compress it progressively until it reaches the combustion chamber 8.

An inlet fan 16 is coupled to the rotor 12, possibly via an epicyclic reduction gear (not shown), and generates a flow of air which splits into a primary flow 18 passing through the various aforementioned stages of the turbomachine, and a secondary flow 20 passing through an annular duct (partially shown) along the turbomachine to then join the primary flow at the turbine outlet.

The secondary flow can be accelerated so as to generate a thrust reaction necessary for the flight of an aircraft. The primary 18 and secondary 20 flows are coaxial annular flows. They are channelled by the casing of the turbomachine and/or by ferrules.

Figure 2:
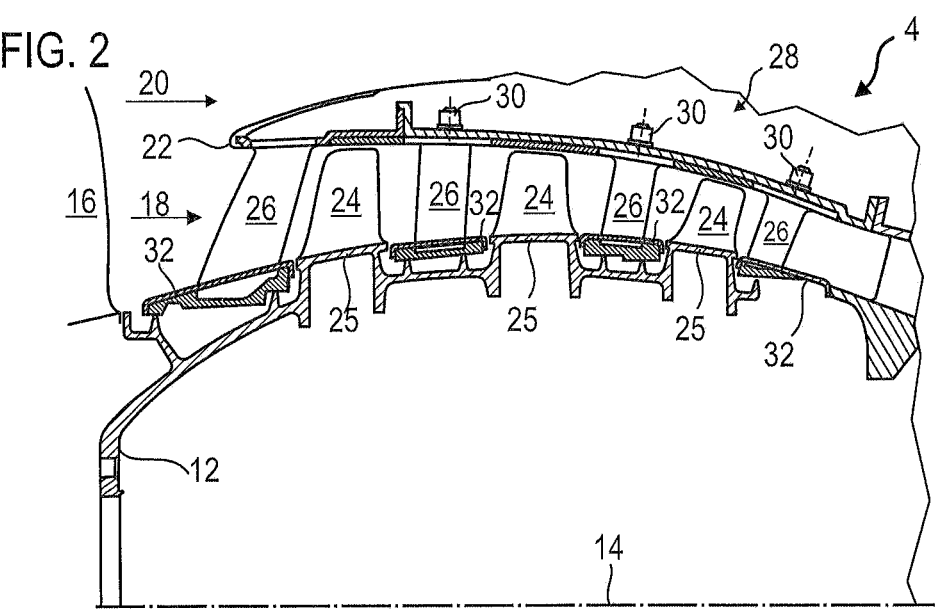
FIG. 2 is a diagram of a turbomachine compressor according to the present application.

FIG. 2 is a sectional view of a compressor of an axial turbomachine such as the one of FIG. 1. The compressor can be a low-pressure compressor 4. One can see on FIG. 2 a portion of the fan 16 and the separation nozzle 22 of the primary flow 18 and the secondary flow 20.

The rotor 12 comprises several rows of rotor blades 24, in this case three. It may be a bladed one-piece drum, or it may include dovetail-mounted blades. The rotor blades 24 may extend radially from an individual platform, or from an inner ring 25 of the rotor 12.

The low-pressure compressor 4 comprises several rectifiers, in this case four, each containing a row of stator vanes 26. The rectifiers are associated with the fan 16 or with a row of rotor blades to straighten the air flow, so as to convert the speed of the flow into pressure, in particular into static pressure.

The stator vanes 26 extend essentially radially from an outer casing 28, and can be fixed thereto and immobilized by means of axes 30. Alternatively, the vanes can be glued or welded. They pass radially through the primary flow 18. Their blades can pass through the annular wall of the outer casing 28. Within the same row, the stator vanes 26 are regularly spaced from one another and have the same angular orientation in the flow 18. Their chord lines can have a fixed inclination with respect to the axis of rotation 14. Advantageously, the blades of the same row are identical and aligned. Each row of blades 26, 24 may comprise from fifty to one hundred or one hundred and twenty units.

Internal ferrules 32 may be suspended at the inner ends of the stator vanes 26. The inner ferrules 32 may cooperate tightly with the rotor 12 to improve the compression ratio of the compressor 4.

Figure 3:
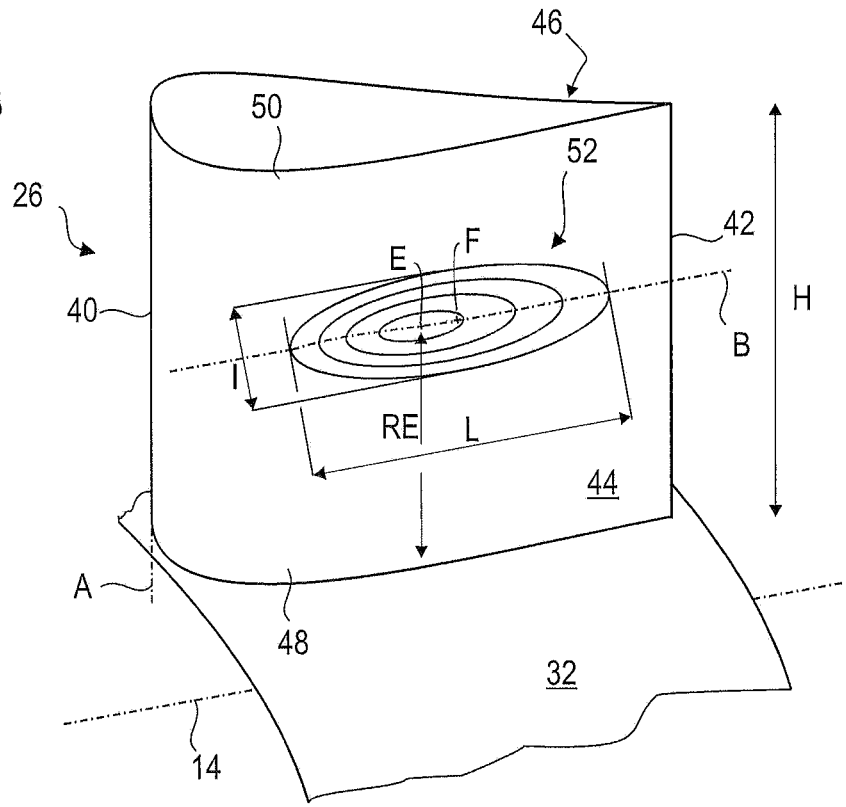
FIG. 3 illustrates an isometric view of a blade according to the present application having an irregularity on its suction surface.

FIG. 3 outlines a first example of a blade 26 according to the present application in isometric view. The blade 26 comprises a leading edge 40, a trailing edge 42, a suction surface 44 and a pressure surface 46 (invisible in FIG. 3). These surfaces 44, 46 are curved and extend from the leading edge 40 to the trailing edge 42. The representation of the blade is schematic and the camber of the suction surface and the pressure surface are not necessarily at scale. The present application is here described in particular for a stator vane 26 but the same types of irregularities can be provided on a rotor blade.

The leading edge 40 extends in an average direction noted A. It can be substantially radial.

The blade 26 extends from an inner radial end, called root 48, to an outer radial end called head 50 of a height H.

In this example, the blade 26 comprises an irregularity 52 in the form of a protuberance on the suction surface. This extends of a length L in a direction of longest dimension B which in this example is parallel to the axis 14. Transversally, that is to say according to the radial height of the blade 26, the protuberance 52 extends of a width I. A point E is the highest point of the protuberance.

The radial position of the point E can be marked radially with respect to the root of the blade 48 by the parameter RE. According to various embodiments of the present application, RE may be between 25 and 75% of H or between 70 and 100% of H. Other positions are possible, for example from 0 to 30%.

A point F is in the center of the protuberance 52, that is to say it separates the protuberance 52 in two equal parts along the axis B of the length L.

The protuberance 52 is represented using elevation contours for materializing the variations thereof.

The blade 26 is fixed at its root 48 to an inner shell 32 or ferrule. The shell 32 is axisymmetric. At each point of the shell, it has a constant radius around the axis 14. The ferrule 32 is devoid of irregularity. Alternatively, an irregularity of the bump or hollow type may be provided on the ferrule 32.

Figure 4:
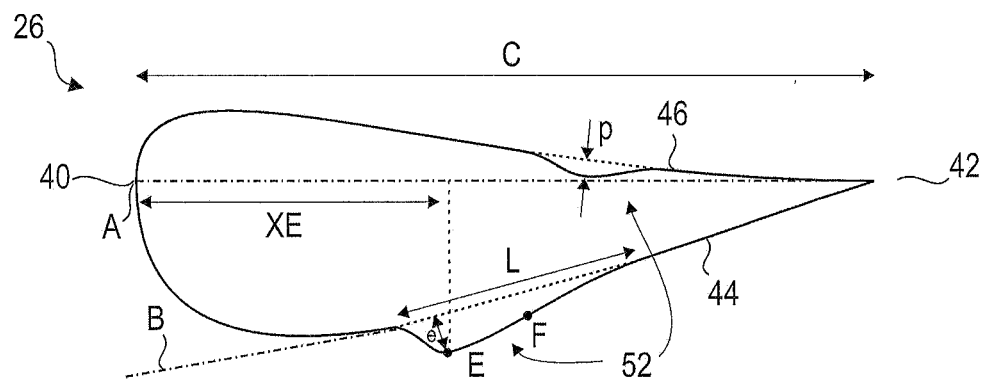
FIG. 4 shows a section of the blade of FIG. 3 in a plane perpendicular to the main direction of the blade.

FIG. 4 is a sectional view in a plane perpendicular to the direction A of FIG. 3 and passing through point E. For the particular blade 26 of FIG. 3, this plane comprises the straight line indicating the direction B.

FIG. 4 shows two examples of irregularity 52: a protuberance on the suction surface 44 and a recess on the pressure surface 46. It is to be noted that the present application is not limited to this type of configuration and that suction surface 44 as well as a pressure surface 46 may be provided without any, one or more recesses/protuberances. Also, the irregularities of the suction and pressure surface are not limited to being positioned in the same plane and it is for the sake of simplification that both are represented here in the same section of the blade 26.

The point E represents the top of the irregularity 52. This is at a distance e, measured normally to the suction surface, e defining the thickness or amplitude of the irregularity with respect to the suction surface.

The irregularity extends over a length L. The length L can be measured in a curvilinear manner according to the nominal line (in dotted lines) of the suction surface 44 in the absence of irregularity.

Point F is the center of the irregularity, halfway longitudinally. For some forms of irregularities, points E and F can be identical.

The irregularity 52 of the pressure surface side 46 illustrates the depth p of a recess. The same parameters E, F, L can be used (not shown).

The chord is the straight line that connects the leading edge 40 to the trailing edge 42. The length of the chord is noted here C. The position of the point E can be marked on the chord by the parameter noted here XE.

According to various embodiments of the present application, XE can be between 0 and 30% of C or between 0 and 50% of C. Other positions are possible, for example from 50 to 70%.

FIG. 5A to 5D show, in a view normal to the suction surface 44, other examples of irregularities 52 that can be received by the suction surface 44 or the pressure surface 46 of the blade 26. Each of the examples can be adapted to the suction surface or pressure surface, alone or in combination with other irregularities. The shapes shown may be indifferently applied to a protrusion or a recess. When the blade includes several irregularities, they may be discontinuous or in the extension of the flow of one another. For example, a recess may follow a protrusion or vice versa.

Figure 5A:
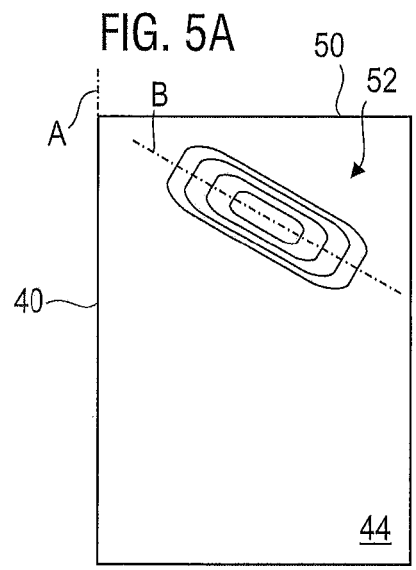
FIG. 5A to 5D illustrate various examples of irregularities.

FIG. 5A describes an example of irregularity 52 in the vicinity of the head 50 of the blade 26. The irregularity 52 forms an angle of approximately 60° with the leading edge 40 and the point E is in the middle of the blade axially and is located at about 75% of the height of blade.

Figure 5B:
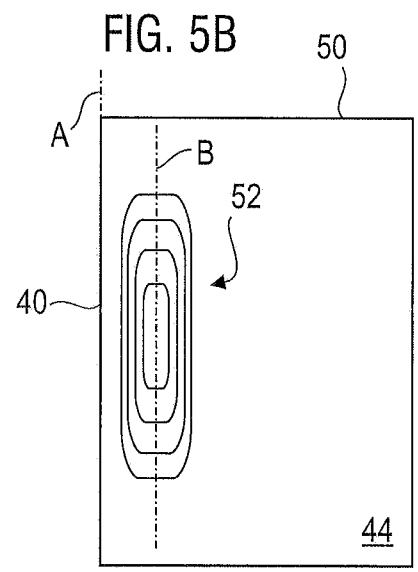

FIG. 5B depicts an irregularity 52 which is substantially parallel to the leading edge 40. In this example, the irregularity 52 extends in height by a length of about half the height of the blade.

Figure 5C:
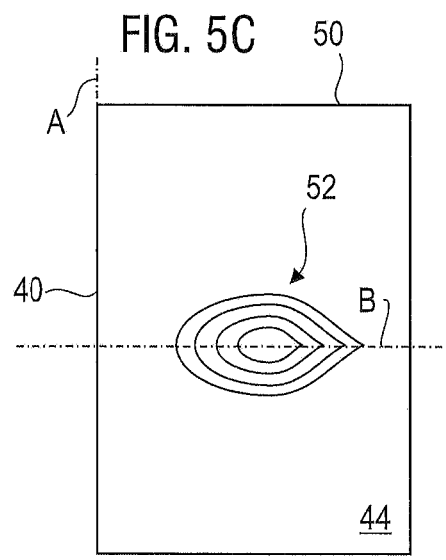

FIG. 5C shows another irregularity 52 which illustrates that the width of the irregularity may not be constant over the entire extent of the irregularity 52. In this example, the irregularity 52 has a shape of a drop of water. Triangular or trapezoidal shapes are also possible. The greatest width can be upstream or downstream.

Figure 5D:
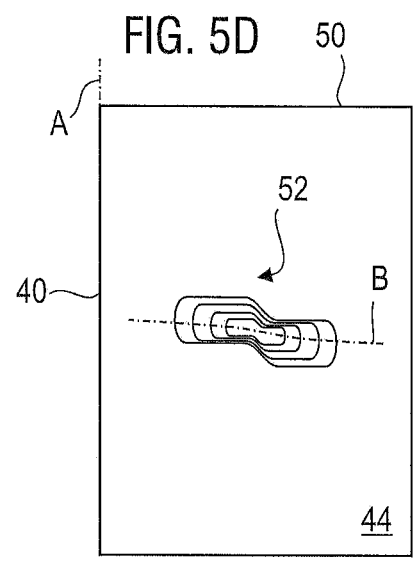

FIG. 5D illustrates a variant in which the irregularity 52 has a main direction which is not linear. In this particular case, the irregularity describes an S-shaped curve. Such an irregularity makes it possible to radially converge a flow, for example in the downstream part of a compressor, before the gooseneck-shaped portion between the low-pressure and high-pressure compressors.

Figure 6:
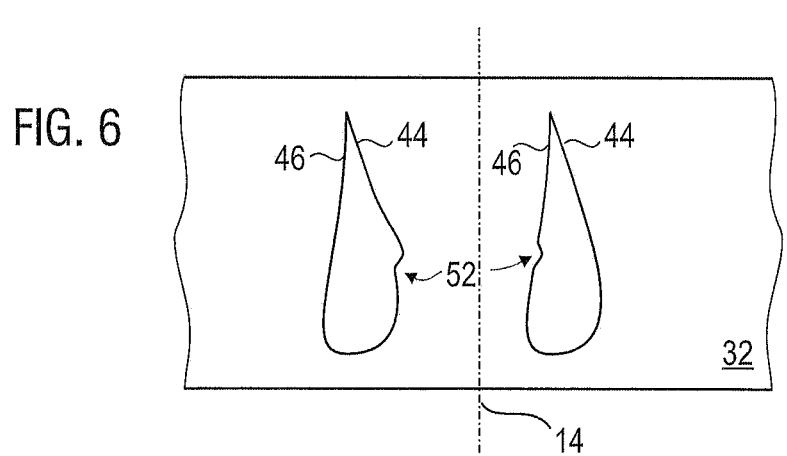
FIG. 6 shows a compressor part with two adjacent blades.

FIG. 6 illustrates in a radial projection view, two adjacent blades of a compressor. The blades have a protuberance and a recess 52, respectively, facing each other. The geometric surfaces that define these opposite irregularities are identical at least in part, one being the image of the other by rotation about the axis 14, or by translation along an axis perpendicular to the radius. Thus, the two blades can at least partially guide the flow in the same way.

I claim:

1. A blade for an axial turbomachine compressor, the blade comprising:
   a leading edge;
   a trailing edge;
   a suction surface;
   a pressure surface; and
   exactly one irregularity in the form of a recess nested in the suction surface or in the pressure surface, the irregularity having a direction of longest dimension that is parallel to the leading edge, the irregularity having a length of half of a height of the blade and being arranged closer to the leading edge than to the trailing edge, the irregularity having a variation of depth or thickness along said direction, wherein a point of the irregularity having the maximum thickness or maximum depth has a radial position which is between 25 and 75% of the height of the blade.

2. The blade according to claim 1, wherein the point of the irregularity having the maximum thickness or depth has a position along the chord line, measured from the leading edge, that is between 0 and 30% of the chord line.

3. The blade according to claim 1, wherein the blade comprises a root and a head defining radial ends of the blade, the irregularity being at a distance from the root and from the blade head of at least 5% of the radial height of the blade.

4. The blade according to claim 1, wherein the maximum thickness or the depth of the irregularity, measured according to a plane normal to the suction surface or the pressure surface is between 1 and 15% of the thickness of the blade at the position of the point of the irregularity having the maximum thickness or depth.

5. The blade according to claim 1, wherein the irregularity is asymmetrical, a middle point of the irregularity in the direction of longest dimension being downstream of the point having the maximum thickness or depth.

6. The blade according to claim 1, wherein the irregularity comprises a plurality of points for which the thickness or the depth of the irregularity is maximum.

7. The blade according to claim 1, wherein the irregularity extends along an S-shaped non-linear direction.

8. The blade according to claim 1, wherein the irregularity has a variation in width.

9. A compressor of a turbomachine, comprising:
   at least one row of rotor blades; and
   at least one row of stator blades;
   wherein two adjacent blades of the at least one row of rotor blades or of the at least one row of stator blades comprises, each:
      a leading edge;
      a trailing edge;
      a suction surface;
      a pressure surface; and
      at least one irregularity in the form of a protrusion protruding from the suction surface or from the pressure surface or in the form of a recess nested in the suction surface or in the pressure surface, the irregularity having a direction of longest dimension that is substantially parallel to the leading edge, the irregularity having a variation of depth or thickness along said direction, wherein a point of the irregularity having the maximum thickness or maximum depth has a radial position which is between 25 and 75% of a height of the blade;
   wherein an irregularity of the at least one irregularity of one blade of the two adjacent blades is in the form of a protrusion protruding from the suction surface facing the other one of the two adjacent blades; and
   wherein an irregularity of the at least one irregularity of the other one of the two adjacent blades is in the form of a recess nested in the pressure surface facing the one of the two adjacent blades; and
   wherein the irregularity on the suction surface of the one of the two blades forms a first geometric surface and the irregularity on the pressure surface of the other of the two blades forms a second geometric surface, the first and second surfaces being at least in part parallel to one another or being at least in part the image of one another after rotation about the axis of the compressor.

* * * * *